United States Patent
Sun et al.

(10) Patent No.: US 11,606,231 B2
(45) Date of Patent: Mar. 14, 2023

(54) REFERENCE SIGNAL CONFIGURATION METHOD, NETWORK SIDE DEVICE AND USER EQUIPMENT

(71) Applicant: VIVO MOBILE COMMUNICATION CO., LTD., Chang'an Dongguan (CN)

(72) Inventors: Xiaodong Sun, Chang'an Dongguan (CN); Yu Ding, Chang'an Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 31 days.

(21) Appl. No.: 16/472,390

(22) PCT Filed: Dec. 21, 2017

(86) PCT No.: PCT/CN2017/117664
§ 371 (c)(1),
(2) Date: Jun. 21, 2019

(87) PCT Pub. No.: WO2018/113721
PCT Pub. Date: Jun. 28, 2018

(65) Prior Publication Data
US 2019/0363848 A1 Nov. 28, 2019

(30) Foreign Application Priority Data
Dec. 23, 2016 (CN) .......................... 201611207175.5

(51) Int. Cl.
*H04W 72/08* (2009.01)
*H04L 27/26* (2006.01)
(Continued)

(52) U.S. Cl.
CPC ........ *H04L 27/2602* (2013.01); *H04L 5/0048* (2013.01); *H04L 5/0051* (2013.01); *H04W 72/042* (2013.01); *H04W 72/0446* (2013.01)

(58) Field of Classification Search
None
See application file for complete search history.

(56) References Cited

U.S. PATENT DOCUMENTS

| | | | |
|---|---|---|---|
| 2011/0111781 A1 | 5/2011 | Chen et al. | |
| 2011/0200135 A1* | 8/2011 | Sorrentino | H04B 7/0413 375/295 |

(Continued)

FOREIGN PATENT DOCUMENTS

| | | |
|---|---|---|
| CN | 102118861 A | 7/2011 |
| CN | 102598573 A | 7/2012 |

(Continued)

OTHER PUBLICATIONS

Chinese Search Report for Chinese Application No. 201611207175.5 dated Dec. 28, 2019 (dated Oct. 18, 2019)—5 pages (English translation—3 pages).

(Continued)

*Primary Examiner* — Brandon M Renner
(74) *Attorney, Agent, or Firm* — Culhane Meadows PLLC; Stephen J. Weed

(57) ABSTRACT

A reference signal configuration method, a network side device and a User Equipment (UE) are provided. The reference signal configuration method includes: configuring a reference signal configuration parameter for the UE; and transmitting the reference signal configuration parameter to the UE. The reference signal configuration parameter is used by the UE to transmit a reference signal.

9 Claims, 6 Drawing Sheets

(51) Int. Cl.
*H04L 5/00* (2006.01)
*H04W 72/04* (2023.01)
*H04W 72/0446* (2023.01)

(56) References Cited

U.S. PATENT DOCUMENTS

| | | | |
|---|---|---|---|
| 2011/0268050 A1 | 11/2011 | Farajidana et al. | |
| 2012/0176939 A1 | 7/2012 | Qu et al. | |
| 2012/0252447 A1* | 10/2012 | Sartori | H04W 24/10 455/434 |
| 2012/0258724 A1* | 10/2012 | Kim | H04W 72/082 455/452.2 |
| 2013/0301543 A1* | 11/2013 | Eriksson | H04W 72/042 370/329 |
| 2013/0315212 A1* | 11/2013 | Sorrentino | H04W 72/0413 370/336 |
| 2016/0050577 A1* | 2/2016 | Rao | H04W 48/18 370/252 |
| 2016/0095104 A1* | 3/2016 | Chen | H04W 72/14 370/329 |
| 2016/0270112 A1* | 9/2016 | Dinan | H04W 72/0453 |
| 2017/0048009 A1* | 2/2017 | Sarkar | H04B 17/21 |
| 2017/0208581 A1* | 7/2017 | Yang | H04L 1/1854 |
| 2017/0244501 A1* | 8/2017 | Yasukawa | H04B 17/27 |
| 2017/0251465 A1* | 8/2017 | Andersson | H04L 5/0048 |
| 2018/0255444 A1* | 9/2018 | Chae | H04W 4/44 |
| 2018/0255543 A1* | 9/2018 | Takeda | H04W 72/0446 |
| 2021/0289488 A1* | 9/2021 | Cheng | H04L 5/0048 |

FOREIGN PATENT DOCUMENTS

| | | |
|---|---|---|
| CN | 102687413 A | 9/2012 |
| CN | 102740479 A | 10/2012 |
| CN | 103314614 A | 9/2013 |
| CN | 103582141 A | 2/2014 |
| CN | 104968052 A | 10/2015 |

OTHER PUBLICATIONS

Extended European Search Report for European Application No. 17882425.6, dated Nov. 13, 2019 (dated Nov. 13, 2019)—9 pages.
Huawei, HiSilicon.: "DL DM-RS for data transmissions", R1-1611244—3GPP TSG RAN WG1 Meeting #87, Nov. 14, 2016, Reno, Nevada, USA (5 pages).
International Search Report and Written Opinion for International Application No. PCT/CN2017/117664, dated Mar. 7, 2018 (dated Mar. 7, 2018)—9 pages; and English translation dated Jul. 4, 2019 (dated Jul. 4, 2019)—6 pages.
Nokia, Alcatel-Lucent Shanghai Bell.: "On 2-OS sPUSCH structure and details of UL DMRS in shorter TTI", R1-1612153—3GPP TSG-RAN WG1 Meeting #87, Nov. 14, 2016, Reno, Nevada, USA (5 pages).
Spreadtrum Communications.: "Discussion on a sPUSCH design for sTTI", R1-1608914—3GPP TSG RAN WG1 Meeting #86bis, Oct. 10, 2016, Lisbon, Portugal (4 pages).

* cited by examiner

REFERENCE SIGNAL CONFIGURATION METHOD, NETWORK SIDE DEVICE AND USER EQUIPMENT

CROSS-REFERENCE TO RELATED APPLICATION

The present application is the U.S. national phase of PCT Application No. PCT/CN2017/117664 filed on Dec. 21, 2017, which claims a priority of the Chinese patent application No. 201611207175.5 filed on Dec. 23, 2016, which is incorporated herein by reference in its entirety.

TECHNICAL FIELD

The present disclosure relates to the field of communication technology, in particular to a reference signal configuration method, a network side device and a User Equipment (UE).

BACKGROUND

For a future communication system, it is necessary to support various service types, various numerical configurations and various multiple access modes. For example, a future $5^{th}$-Generation (5G) mobile communication system needs to support not only enhanced Mobile Broad Band (eMBB) and massive Machine Type Communications (mMTC) services, but also Ultra-Reliable and Low Latency Communications (URLLC) services. In addition, the 5G mobile communication system needs to support a system frequency including a low frequency less than 6 GHz and a high frequency within the range from 6 GHz to 100 GHz, and different system frequencies may lead to different numerical configurations of the system. Furthermore, the 5G mobile communication system supports not only an Orthogonal Frequency Division Multiple Access (OFDMA) mode but also a Single Carrier Frequency Division Multiple Access (SC-FDMA) mode for uplink transmission. However, an uplink control channel reference signal is allocated symmetrically at two ends of a system frequency band in a conventional communication system. Due to the symmetry, it is impossible for the reference signal to support various service types, various numerical configurations and various multiple access modes. Hence, there is an urgent need to provide a scheme so as to enable the reference signal to support various service types, various numerical configurations and various multiple access modes.

SUMMARY

An object of the present disclosure is to provide a reference signal configuration method, a network side device and a UE, so as to enable a reference signal to support various service types, various numerical configurations and various multiple access modes.

In one aspect, the present disclosure provides in some embodiments a reference signal configuration method for use in a network side device, including: configuring a reference signal configuration parameter for a UE; and transmitting the reference signal configuration parameter to the UE. The reference signal configuration parameter is a control channel reference signal configuration parameter, and the control channel reference signal configuration parameter includes at least one of a frequency-domain density of a control channel reference signal, a minimum frequency domain resource allocation unit of a control channel, a minimum frequency domain resource allocation unit of the control channel reference signal, and an identifier of a resource occupation symbol of the control channel reference signal. The reference signal configuration parameter is used by the UE to transmit a reference signal.

In another aspect, the present disclosure provides in some embodiments a reference signal configuration method for use in a UE, including: receiving a reference signal configuration parameter from a network side device, the reference signal configuration parameter being a control channel reference signal configuration parameter, the control channel reference signal configuration parameter including at least one of a frequency-domain density of a control channel reference signal, a minimum frequency domain resource allocation unit of a control channel, a minimum frequency domain resource allocation unit of the control channel reference signal, and an identifier of a resource occupation symbol of the control channel reference signal; and transmitting a reference signal in accordance with the reference signal configuration parameter.

In yet another aspect, the present disclosure provides in some embodiments a network side device, including: a configuration module configured to configure a reference signal configuration parameter for a UE, the reference signal configuration parameter being a control channel reference signal configuration parameter, the control channel reference signal configuration parameter including at least one of a frequency-domain density of a control channel reference signal, a minimum frequency domain resource allocation unit of a control channel, a minimum frequency domain resource allocation unit of the control channel reference signal, and an identifier of a resource occupation symbol of the control channel reference signal; and a transmission module configured to transmit the reference signal configuration parameter configured by the configuration module to the UE. The reference signal configuration parameter is used by the UE to transmit a reference signal.

In still yet another aspect, the present disclosure provides in some embodiments a UE, including: a reception module configured to receive a reference signal configuration parameter from a network side device, the reference signal configuration parameter being a control channel reference signal configuration parameter, the control channel reference signal configuration parameter including at least one of a frequency-domain density of a control channel reference signal, a minimum frequency domain resource allocation unit of a control channel, a minimum frequency domain resource allocation unit of the control channel reference signal, and an identifier of a resource occupation symbol of the control channel reference signal; and a transmission module configured to transmit a reference signal in accordance with the reference signal configuration parameter received by the reception module.

In still yet another aspect, the present disclosure provides in some embodiments a network side device, including a processor, a memory, and a computer program stored in the memory and executed by the processor. The computer program is executed by the processor so as to implement the above-mentioned reference signal configuration method.

In still yet another aspect, the present disclosure provides in some embodiments a UE, including a processor, a memory, and a computer program stored in the memory and executed by the processor. The computer program is executed by the processor so as to implement the above-mentioned reference signal configuration method.

In still yet another aspect, the present disclosure provides in some embodiments a computer-readable storage medium storing therein a computer program. The computer program is executed by a processor to implement the above-mentioned reference signal configuration method.

In still yet another aspect, the present disclosure provides in some embodiments a computer-readable storage medium storing therein a computer program. The computer program is executed by a processor to implement the above-mentioned reference signal configuration method.

According to the embodiments of the present disclosure, the network side device may configure the reference signal configuration parameter for the UE and transmit the reference signal configuration parameter to the UE, and the reference signal configuration parameter is used by the UE to transmit the reference signal. The reference signal configuration parameter is configured by the network side device, so it is able for the reference signal to support various service types, various numerical configurations and various multiple access modes.

BRIEF DESCRIPTION OF THE DRAWINGS

In order to illustrate the technical solutions of the present disclosure or the related art in a clearer manner, the drawings desired for the present disclosure or the related art will be described hereinafter briefly. Obviously, the following drawings merely relate to some embodiments of the present disclosure, and based on these drawings, a person skilled in the art may obtain the other drawings without any creative effort.

FIG. 4 is a schematic view showing the resource mapping of a

Figure 5:
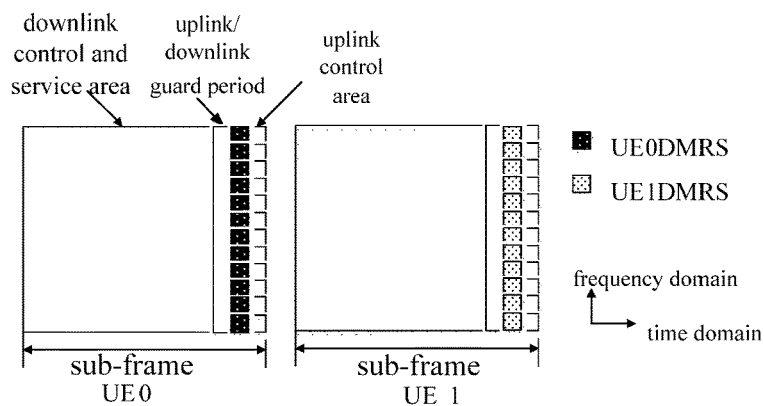
Figure 6:
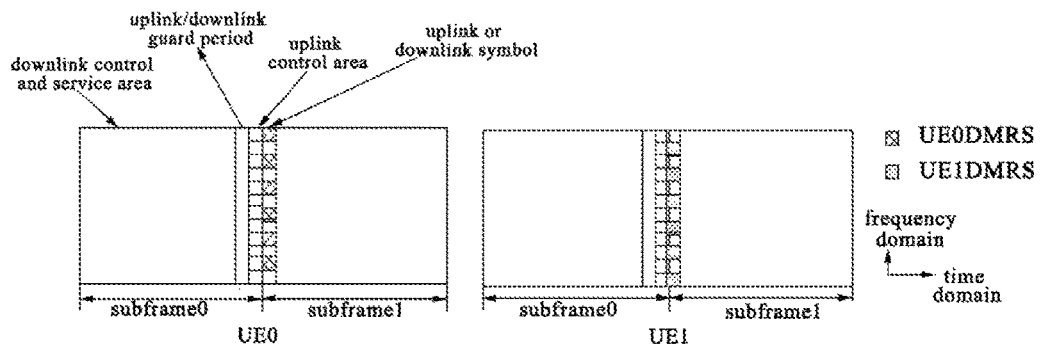
Figure 7:
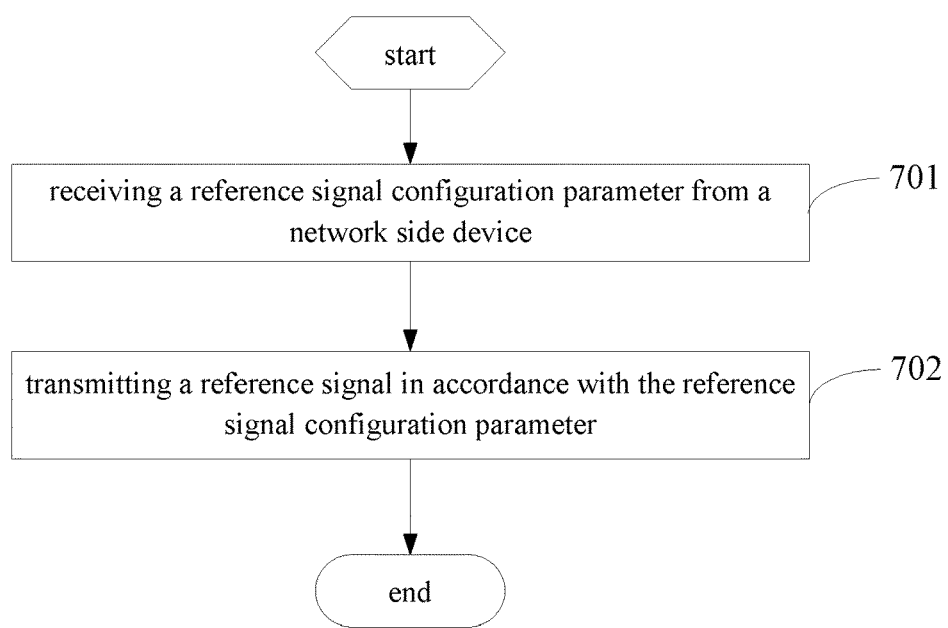
Figure 8:
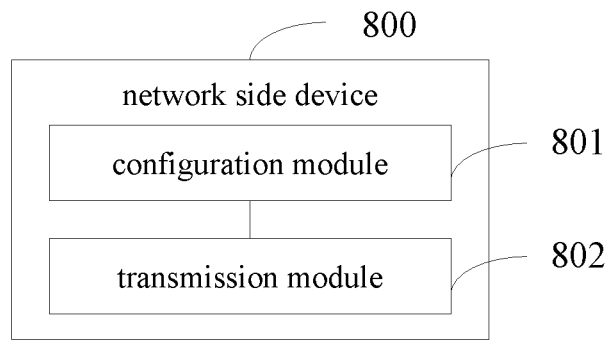
Figure 9:
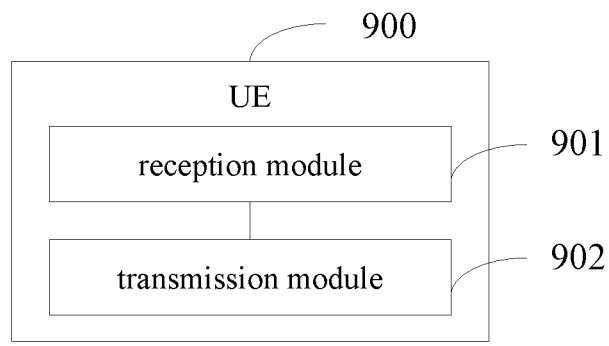
Figure 10:
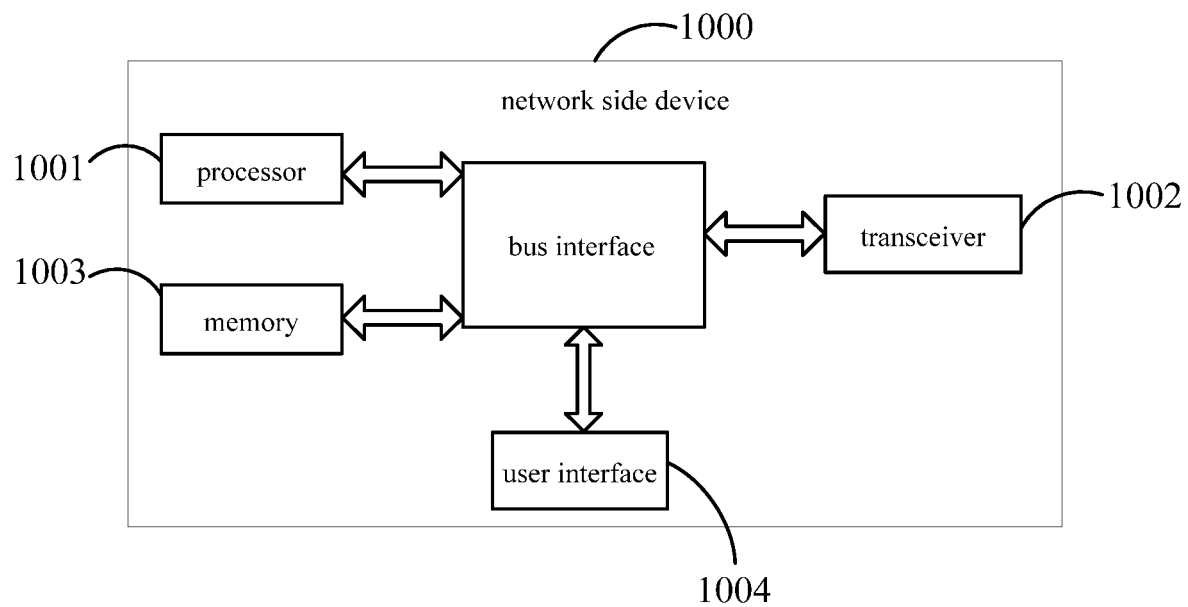
Figure 11:
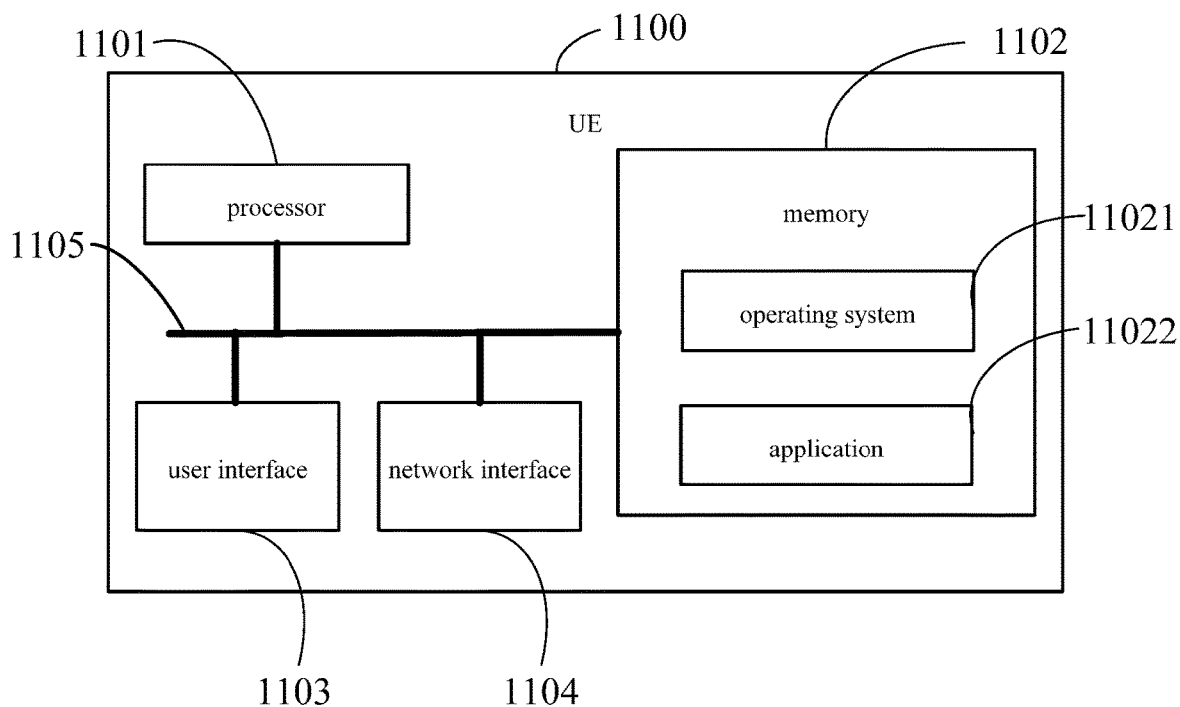
Figure 12:
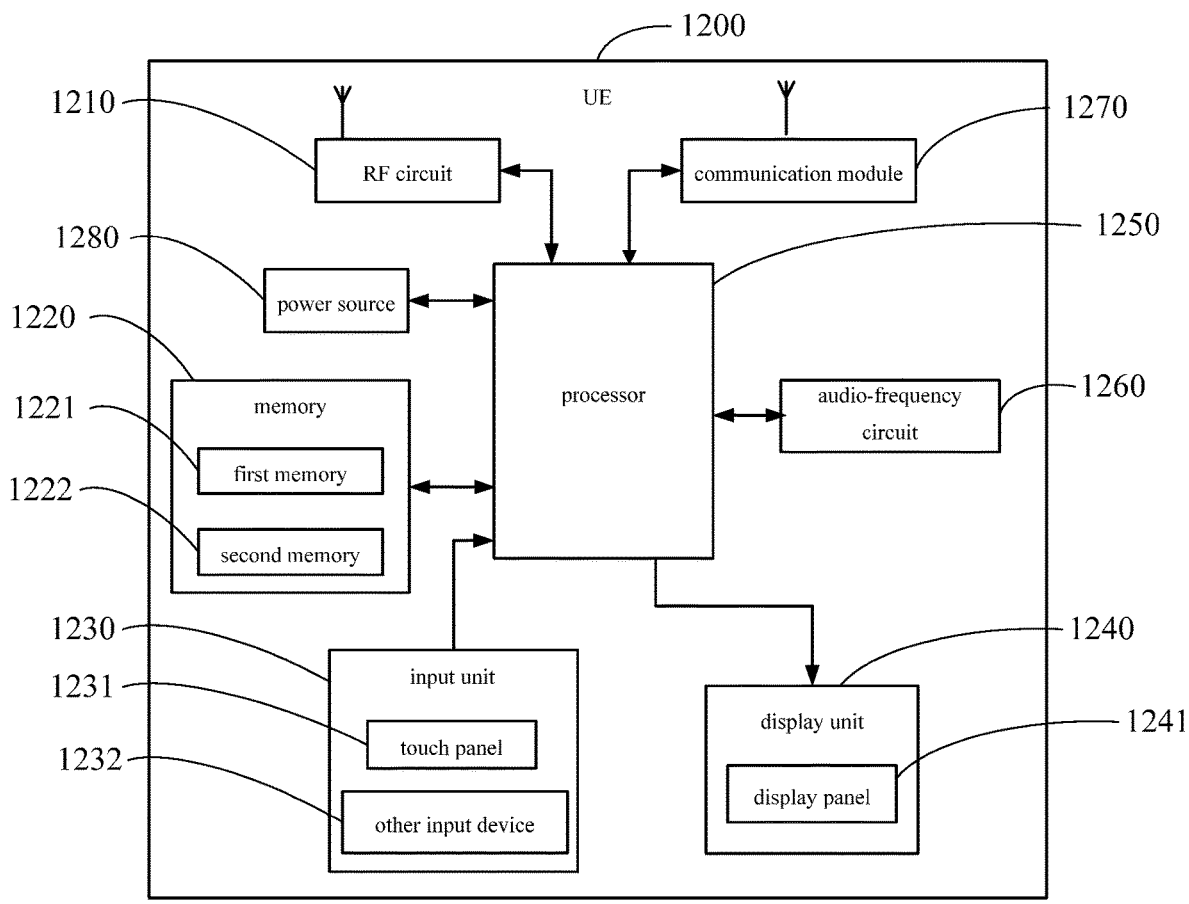

Demodulation Reference Signal (DMRS) in a frequency domain according to the second embodiment of the present disclosure;

FIG. 5 is another schematic view showing the resource mapping of the DMRS in the frequency domain according to the second embodiment of the present disclosure;

FIG. 6 is yet another schematic view showing the resource mapping of the DMRS in the frequency domain according to the second embodiment of the present disclosure;

FIG. 7 is a flow chart of a reference signal configuration method according to a third embodiment of the present disclosure;

FIG. 8 is a schematic view showing a network side device according to a fourth embodiment of the present disclosure;

FIG. 9 is a schematic view showing a UE according to one embodiment of the present disclosure;

FIG. 10 is another schematic view showing the network side device according to a sixth embodiment of the present disclosure;

FIG. 11 is another schematic view showing the UE according to a seventh embodiment of the present disclosure; and FIG. 12 is yet another schematic view showing the UE according to an eighth embodiment of the present disclosure.

DETAILED DESCRIPTION OF THE EMBODIMENTS

In order to make the objects, the technical solutions and the advantages of the present disclosure more apparent, the present disclosure will be described hereinafter in a clear and complete manner in conjunction with the drawings and embodiments. Obviously, the following embodiments merely relate to a part of, rather than all of, the embodiments of the present disclosure, and based on these embodiments, a person skilled in the art may, without any creative effort, obtain the other embodiments, which also fall within the scope of the present disclosure.

Figure 1:
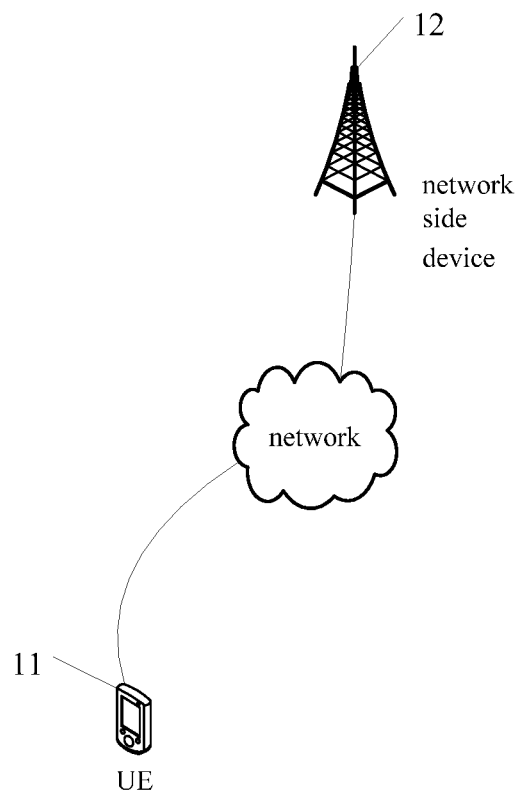
FIG. 1 is a schematic view showing an applicable network according to one embodiment of the present disclosure.

FIG. 1 shows a network to which the scheme in the embodiments of the present disclosure is applicable. As shown in FIG. 1, the network includes a UE 11 and a network side device 12. The UE 11 may be a terminal side device, such as a mobile phone, a tablet personal computer, a laptop computer, a personal digital assistant (PDA), a mobile Internet device (MID) or a wearable device. It should be appreciated that, the type of the UE 11 will not be particularly defined herein. The UE 11 may communicate with the network side device 12, and in FIG. 1, a wireless communication connection is established between the UE 11 and the network side device 12. The network side device 12 may be a transmission reception point (TRP), a base station (e.g., a macro base station such as a Long Term Evolution (LTE) evolved Node B (eNB), or a $5^{th}$-Generation (5G) New Radio (NR) NB), or an access point (AP). It should be further appreciated that, the type of the network side device 12 will not be particularly defined herein.

First Embodiment

Figure 2:
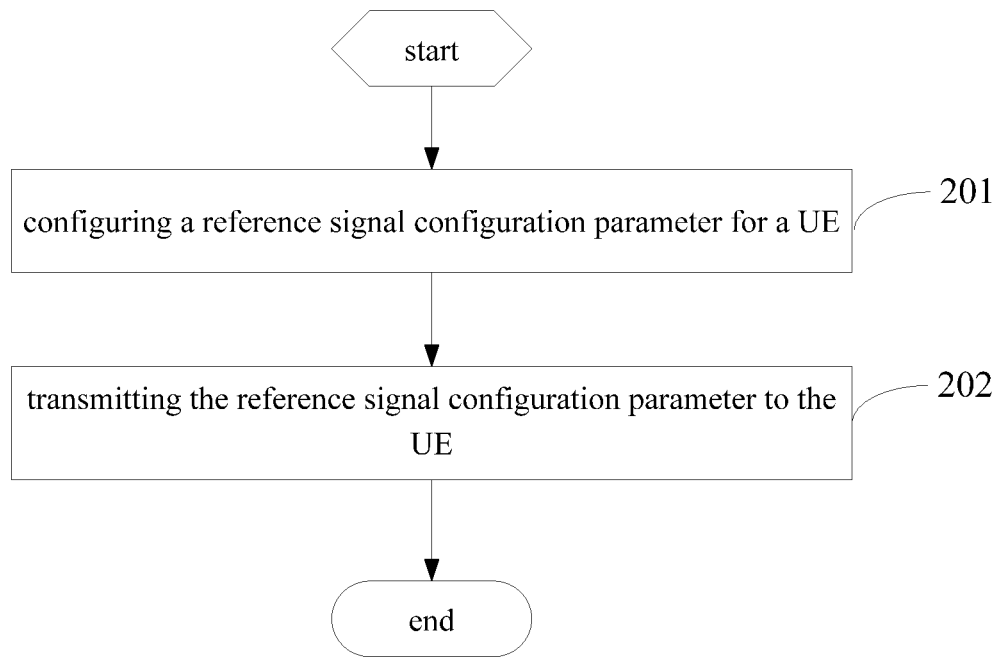
FIG. 2 is a flow chart of a reference signal configuration method according to a first embodiment of the present disclosure.

The present disclosure provides in this embodiment a reference signal configuration method for use in a network side device. As shown in FIG. 2, the reference signal configuration method includes the following steps.

Step 201: configuring a reference signal configuration parameter for a UE.

The network side device may configure the reference signal configuration parameter for the UE in accordance with at least one of a service type, a numerical configuration and a multiple access mode of the UE, so that a reference signal is capable of supporting the service type, the numerical configuration and the multiple access mode of the UE. Of course, the network side device may also configure the reference signal configuration parameter for the UE in accordance with any other information. For example, the network side device may configure the reference signal configuration parameter for the UE in accordance with a current network condition or a measurement result. It should be appreciated that, in the embodiments of the present disclosure, a mode of configuring, by the network side device, the reference signal configuration parameter will not be particularly defined. The network side device may flexibly configure the reference signal configuration parameter for the UE, so as to enable the reference signal transmitted from the UE in accordance with the reference signal configuration parameter to support various service types, various numerical configurations and various multiple access modes, thereby to improve the channel measurement accuracy as well as the demodulation performance. In addition, the reference signal configuration parameter may also be configured dynamically, i.e., the reference signal configuration parameter may be configured for the UE dynamically in accordance with a service parameter, a service requirement and a network condition of the UE, so as to enable the reference signal to effectively support various service types, various numerical configurations and various multiple access modes.

In addition, because the reference signal configuration parameter is configured by the network side device, it is able to control the reference signal in such a manner as to support various service types, various numerical configurations and various multiple access modes, thereby to further improve the channel measurement accuracy as well as the demodulation performance.

Step 202: transmitting the reference signal configuration parameter to the UE.

The reference signal configuration parameter may be used by the UE to transmit the reference signal.

After the reference signal configuration parameter has been configured, the network side device may transmit the reference signal configuration parameter to the UE. Upon the receipt of the reference signal configuration parameter, the UE may configure the reference signal in accordance with the reference signal configuration parameter. Here, the transmission of the reference signal may include transmitting, by the UE, the reference signal to the network side device, or receiving, by the UE, the reference signal from the network side device. In other words, the reference signal configuration parameter may be an uplink reference signal configuration parameter or a downlink reference signal configuration parameter.

In the embodiments of the present disclosure, the reference signal configuration parameter may be configured dynamically through the above-mentioned steps. As a result, it is able for the reference signal transmitted from the UE in accordance with the reference signal configuration parameter to support various service types, various numerical configurations and various multiple access modes, thereby to improve the channel measurement accuracy as well as the demodulation performance.

According to the reference signal configuration method in the embodiments of the present disclosure, the network side device may configure the reference signal configuration parameter for the UE and transmit the reference signal configuration parameter to the UE, and the reference signal configuration parameter may be used by the UE to transmit the reference signal. The reference signal configuration parameter is configured by the network side device, so it is able for the reference signal to support various service types, various numerical configurations and various multiple access modes.

Second Embodiment

Figure 3:
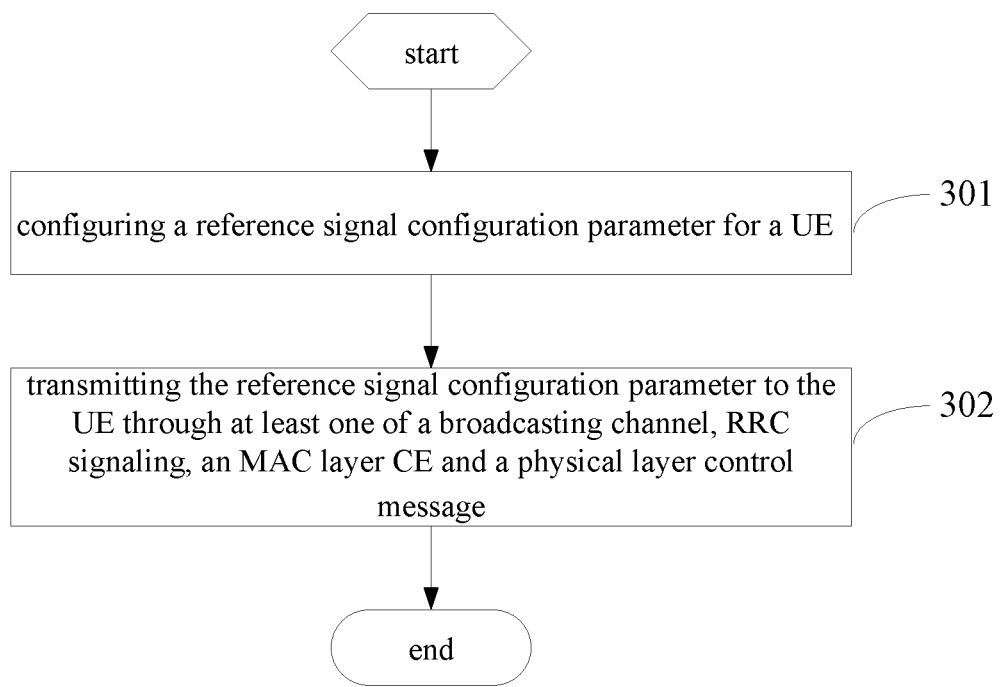
FIG. 3 is another flow chart of the reference signal configuration method according to a second embodiment of the present disclosure.

The present disclosure further provides in this embodiment a reference signal configuration method for use in a network side device. As shown in FIG. 3, the reference signal configuration method includes the following steps.

Step 301: configuring a reference signal configuration parameter for a UE.

The configuration of the reference signal configuration parameter may refer to that mentioned in the first embodiment with a same beneficial effect, which will thus not be particularly defined herein.

In a possible embodiment of the present disclosure, the reference signal configuration parameter may be a control channel reference signal configuration parameter, and the control channel reference signal configuration parameter may include at least one of a frequency-domain density of a control channel reference signal, a minimum frequency domain resource allocation unit of a control channel, a minimum frequency domain resource allocation unit of the control channel reference signal, and an identifier of a resource occupation symbol of the control channel reference signal.

The control channel reference signal configuration parameter may be a physical control channel reference signal configuration parameter, e.g., a Physical Uplink Control Channel (PUCCH) reference signal configuration parameter or a Physical Downlink Control Channel (PDCCH) reference signal configuration parameter.

The frequency-domain density of the control channel reference signal may be a density of the control channel reference signal in a resource element. Taking a Physical Resource Block (PRB) as an example, when the frequency-domain density is ⅙, one of every six carriers may be used for carrying the control channel reference signal, and when the frequency-domain density is 1, each carrier may be used for carrying the control channel reference signal. Through the frequency-domain density, the UE may transmit the reference signal accurately.

The minimum frequency domain resource allocation unit of the control channel may be a minimum resource allocation unit for the transmission of the control channel. For example, the minimum frequency domain resource allocation unit of the control channel may include 4 PRBs, 2 PRBs or 1 PRB, which will not be particularly defined herein. Through the minimum frequency domain resource allocation unit of the control channel, the UE may transmit the control channel through the minimum resource allocation unit, so it is unnecessary to transmit the control channel through excessive resource units, thereby it is able to reduce the overhead for the control channel. In addition, because the reference signal is the control channel reference signal, it is able for the UE to transmit the control channel reference signal through the minimum resource allocation unit, thereby to reduce the overhead for the control channel reference signal.

The minimum frequency domain resource allocation unit of the control channel reference signal may be a minimum resource allocation unit for the transmission of the control channel reference signal. For example, the minimum frequency domain resource allocation unit of the control channel reference signal may include 4 PRBs, 2 PRBs or 1 PRB, which will not be particularly defined herein. Through the minimum frequency domain resource allocation unit of the control channel reference signal, it is able for the UE to transmit the control channel reference signal through the minimum resource allocation unit, thereby to reduce the overhead for the control channel reference signal.

Figure 4:
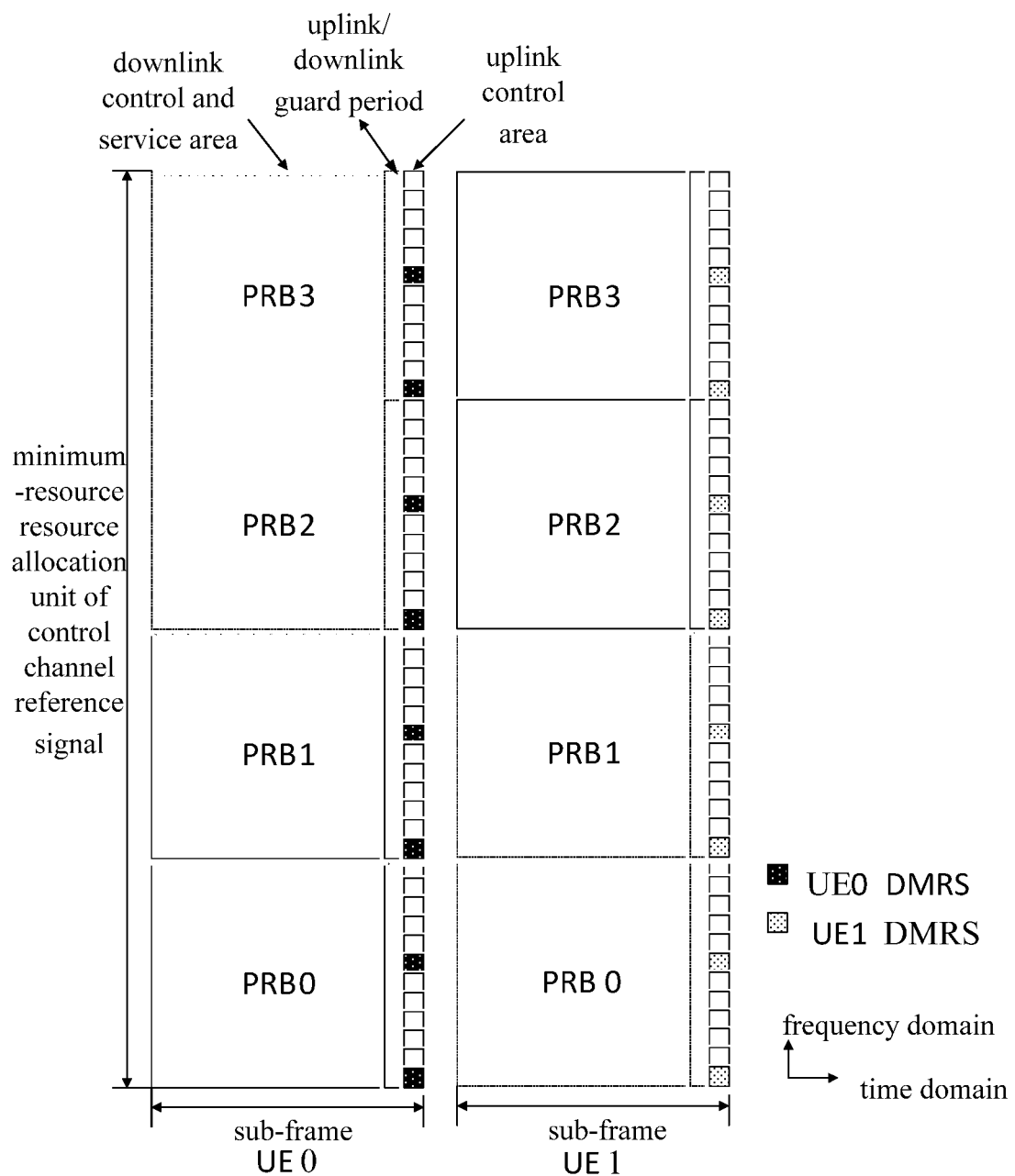

For example, in the case that the reference signal is an uplink control channel DeModulation Reference Signal (DMRS), the minimum frequency domain resource allocation unit of the control channel or the minimum frequency domain resource allocation unit of the control channel reference signal includes 4 PRBs and the frequency-domain density of the DMRS is ⅙, FIG. 4 shows a resource mapping of the DMRS in a frequency domain. The DMRSs for different UEs may be differentiated from each other through an orthogonal code or Cyclic Shift (CS).

The resource occupation symbol identifier of the control channel reference signal may be an identifier of a symbol occupied by a resource of the control channel reference signal, i.e., the symbols occupied by the source of the control channel reference signal may be determined through the identifier. Upon the receipt of the resource occupation symbol identifier of the control channel reference signal, the UE may determine the symbols for the transmission of the control channel reference signal, and thereby transmit the control channel reference signal on these symbols. In this way, it is able to prevent the UE from monitoring or transmitting the reference signal on a plurality of symbols, thereby to reduce the power consumption for the UE. In addition, due to the existence of the resource occupation symbol identifier of the control channel reference signal, the scheme in the embodiments of the present disclosure may be adapted to an SC-FDMA system in a better manner. This is because, through the resource occupation symbol identifier of the control channel reference signal, it is able for the resource of the control channel reference signal to separately occupy one or more symbols, thereby to be adapted to a single-carrier characteristic of the SD-FDMA system.

For example, in the case that a symbol prior to an uplink control channel is occupied by a resource for an uplink control channel DMRS and the frequency-domain density of the DMRS is 1, FIG. 5 shows a resource mapping of the DMRS in a time domain. The DMRSs for different UEs may be differentiated from each other through different cyclically-shifted sequences.

It should be appreciated that, the control channel reference signal configuration parameter may merely include any one of the frequency-domain density of the control channel reference signal, the minimum frequency domain resource allocation unit of the control channel, the minimum frequency domain resource allocation unit of the control channel reference signal, and the identifier of the resource occupation symbol of the control channel reference signal. When the control channel reference signal configuration parameter includes the frequency-domain density of the control channel reference signal, the minimum frequency domain resource allocation unit of the control channel or the minimum frequency domain resource allocation unit of the control channel reference signal may be pre-agreed, or the identifier of the resource occupation symbol of the control channel reference signal may be pre-agreed too. When the control channel reference signal configuration parameter includes the minimum frequency domain resource allocation unit of the control channel or the minimum frequency domain resource allocation unit of the control channel reference signal, the frequency-domain density of the control channel reference signal may be pre-agreed, and the identifier of the resource occupation symbol of the control channel reference signal may not pre-agreed. In this case, it is able to perform the resource mapping of the control channel reference signal in the frequency domain, i.e., perform the frequency-domain resource mapping of the control channel reference signal. When the control channel reference signal configuration parameter includes the identifier of the resource occupation symbol of the control channel reference signal, the frequency-domain density of the control channel reference signal may be pre-agreed, and the minimum frequency domain resource allocation unit of the control channel or the minimum frequency domain resource allocation unit of the control channel reference signal may not be pre-agreed. In this case, it is able to perform the resource mapping of the control channel reference signal in the time domain, i.e., perform the time-domain resource mapping of the control channel reference signal.

Of course, in some scenarios, in order to further improve the measurement accuracy and the demodulation performance, the control channel reference signal configuration parameter may include more than one of the frequency-domain density of the control channel reference signal, the minimum frequency domain resource allocation unit of the control channel, the minimum frequency domain resource allocation unit of the control channel reference signal, and the identifier of the resource occupation symbol of the control channel reference signal. For example, the control channel reference signal configuration parameter may include the frequency-domain density of the control channel reference signal, the identifier of the resource occupation symbol of the control channel reference signal, and the minimum frequency domain resource allocation unit of the control channel and/or the minimum frequency domain resource allocation unit of the control channel reference signal.

In addition, in this embodiment, the control channel reference signal configuration parameter may also be called as the resource mapping of the control channel reference signal, i.e., the UE may determine a resource of the control channel reference signal through the resource mapping.

In a possible embodiment of the present disclosure, the resource occupation symbol of the control channel reference signal may include at least one symbol in the control channel, at least one symbol beyond the control channel and/or at least one symbol in an uplink/downlink guard period.

Through the resource occupation symbol, it is able to transmit the reference signal on at least one symbol in the control channel, beyond the control channel and/or in the uplink/downlink guard period, thereby to improve the flexibility of the reference signal, enable the reference signal to be easily adapted to a future communication system, and improve the performance of the communication system.

In addition, the resource occupation symbol of the control channel reference signal may be identified by the identifier of the resource occupation symbol of the control channel reference signal, so as to dynamically configure the resource of the control channel reference signal for the UE through the identifier. Of course, in some scenarios, the resource of the control channel reference signal may also be pre-configured, which will not be particularly defined herein.

In a possible embodiment of the present disclosure, the at least one symbol beyond the control channel may include at least one symbol adjacent to, and prior to, the control channel, and/or at least one symbol adjacent to, and after, the control channel.

The the resource occupation symbol of the control channel reference signal is located adjacent to the control channel, so it is able to ensure the continuity between the reference signal and the control channel and enable the reference signal to be adapted to a service or system where the continuity is highly demanded, thereby to increase an application range of the reference signal.

In a possible embodiment of the present disclosure, the resource occupation symbol of the control channel reference signal may be used for detecting interference between the network side devices, or a symbol for detecting interference between the UEs, or a symbol for detecting a an uplink service heavy sub-frame, or a symbol for detecting a downlink service heavy sub-frame.

In this embodiment, when the resource occupation symbol of the control channel reference signal is multiplexed as the symbol for detecting the interference, it is able to prevent the control channel reference signal from occupying an additional frequency resource, thereby to improve the performance of the control channel reference signal as well as the resource utilization.

For example, when the uplink control channel DMRS resource occupies one symbol after the uplink control channel, the symbol is further used to detect the interference between the network side devices or the UEs, and the frequency-domain density of the DMRS is ½, FIG. 6 shows the resource mapping of the DMRS in the time domain. The DRMSs for different UEs may be differentiated from each other in a frequency-division manner.

Identically, here, the resource occupation symbol of the control channel reference signal may be identified through the identifier of the resource occupation symbol of the control channel reference signal, so as to dynamically configure the resource of the control channel reference signal for the UE through the identifier. Of course, in some scenarios, the resource of the control channel reference signal may also be pre-configured, which will not be particularly defined herein.

In a possible embodiment of the present disclosure, a same resource of the control channel reference signal may be occupied by different UEs, and the control channel reference signals for different UEs may be differentiated from each other in a time-division, frequency-division, code-division and/or cyclic shift manner.

The code-division manner may include orthogonal sequence scrambling division or orthogonal code division. When the same resource of the control channel reference signal is occupied by the different UEs, it is able to improve the resource utilization. When the control channel reference signals for different UEs are differentiated from each other in a time-division, frequency-division, code-division and/or cyclic shift manner, it is able to improve the flexibility of the resource utilization, and enable the reference signal to support various service types, various numerical configurations and various multiple access modes as well as multiple-user Multiple Input Multiple Output (MIMO) transmission. For example, when the control channel reference signal configuration parameter includes the minimum frequency domain resource allocation unit of the control channel or the minimum frequency domain resource allocation unit of the control channel reference signal, the control channel reference signals for different UEs may be differentiated from each other in an orthogonal sequence scrambling and/or cyclic shift manner, i.e., different cyclically-shifted sequences and/or different scrambled orthogonal sequences may be used by different UEs.

For example, when the control channel reference signal configuration parameter includes the identifier of the resource occupation symbol of the control channel reference signal, the control channel reference signals for different UEs may be differentiated from each other in a time-division, frequency-division, orthogonal sequence scrambling or cyclic shift manner, i.e. different time-division modes, frequency-division modes, cyclically-shifted sequences and/or scrambled orthogonal sequences may be used by different UEs.

For example, when the control channel reference signal configuration parameter includes the minimum frequency domain resource allocation unit of the control channel or the minimum frequency domain resource allocation unit of the control channel reference signal, and the identifier of the resource occupation symbol of the control channel reference signal, the control channel reference signals for different UEs may be differentiated from each other in a time-division, frequency-division, orthogonal sequence scrambling or cyclic shift manner.

In a possible embodiment of the present disclosure, the control channel reference signal may include an uplink control channel reference signal or a downlink control channel reference signal. The uplink control channel reference signal may be used for the demodulation of an uplink control channel, and the downlink control channel reference signal may be used for the demodulation of a downlink control channel.

In this way, in this embodiment of the present disclosure, the uplink or downlink control channel reference signal configuration parameter may be configured for the UE. Upon the receipt of the configuration parameter, the UE may send the uplink control channel reference signal or receive the downlink control channel reference signal on a corresponding resource, and demodulate the uplink or downlink control channel. In a possible embodiment of the present disclosure, the uplink control channel reference signal may include an uplink control channel DMRS, and the downlink control channel reference signal may include a downlink control channel DMRS.

Of course, in this embodiment of the present disclosure, the type of the reference signal will not be particularly defined. For example, the reference signal may also be any other reference signal, e.g., Dedicated Reference Signal (DRS), Sounding Reference Signal (SRS) or Cell-specific Reference signal (CRS), which will not be particularly defined herein.

Step 302: transmitting the reference signal configuration parameter to the UE through at least one of a broadcasting channel, Radio Resource Control (RRC) signaling, a Media Access Control (MAC) layer Control Element (CE) and a physical layer control message.

The reference signal configuration parameter may be used by the UE for transmitting the reference signal.

The physical layer control message may include, but not limited to, a Downlink Control Indicator (DCI).

Through Step 302, the network side device may transmit the reference signal configuration parameter to the UE through at least one of the broadcasting channel, the RRC signaling, the MAC layer CE and the physical layer control message, so as to improve the flexibility of the configuration parameter, thereby to further increase the application range of the reference signal. For example, a fixed parameter of the control channel reference signal configuration parameter may be broadcast through the broadcasting channel, and a variable parameter of the control channel reference signal configuration parameter may be transmitted through at least one of the RRC signaling, the MAC layer CE and the physical layer control message. For example, the frequency-domain density of the control channel reference signal may be transmitted through the broadcasting channel, and at least one of the minimum frequency domain resource allocation unit of the control channel, the minimum frequency domain resource allocation unit of the control channel reference signal and the identifier of the resource occupation symbol of the control channel reference signal may be transmitted through at least one of the RRC signaling, the MAC layer CE and the physical layer control message.

In addition, when the reference signal configuration parameter is transmitted through at least one of the above-mentioned transmission modes, it is able to reduce the power consumption for the network side device and the UE. For example, the fixed parameter of the reference signal configuration parameter may be broadcast through the broadcasting channel one or more times within a certain time period, and the other variable parameter may be transmitted through at least one of the RRC signaling, the MAC layer CE and the physical layer control message after each change.

In addition, it should be appreciated that, in this embodiment, Step 302 may be replaceable, i.e., it may be understood as definition to Step 202 in the first embodiment. For example, in the second embodiment, Step 302 may be replaced by Step 202. Further, the reference signal configuration parameter may be transmitted from the network side device to the UE in any appropriate manner other than that mentioned in Step 302, which will not be particularly defined herein.

According to the reference signal configuration method in the second embodiment of the present disclosure, the reference signal configuration parameter may be configured for the UE, and then transmitted to the UE through at least one of the broadcasting channel, the RRC signaling, the MAC layer CE and the physical layer control message. The reference signal configuration parameter may be used by the UE for transmitting the reference signal. In this way, it is able for the reference signal to support various service types, various numerical configurations and various multiple access modes. In addition, when the reference signal configuration parameter is transmitted to the UE through at least one of the broadcasting channel, the RRC signaling, the MAC layer CE and the physical layer control message, it is able to improve the flexibility of the configuration parameter, thereby to further increase the application range of the reference signal.

Third Embodiment

The present disclosure further provides in this embodiment a reference signal configuration method for use in a UE. As shown in FIG. 7, the reference signal configuration method includes the following steps.

Step 701: receiving a reference signal configuration parameter from a network side device.

The description about the reference signal configuration parameter may refer to that mentioned in the first and second embodiments with a same beneficial effect, which will thus not be particularly defined herein.

Step 702: transmitting a reference signal in accordance with the reference signal configuration parameter.

Upon the receipt of the reference signal configuration parameter, the UE may determine a configuration for the reference signal, and then receive or send the reference signal through the configuration.

In a possible embodiment of the present disclosure, the reference signal configuration parameter may be a control channel reference signal configuration parameter, and the control channel reference signal configuration parameter may include at least one of a frequency-domain density of a control channel reference signal, a minimum frequency domain resource allocation unit of a control channel, a minimum frequency domain resource allocation unit of the control channel reference signal, and an identifier of a resource occupation symbol of the control channel reference signal.

The description about the control channel reference signal configuration parameter may refer to that mentioned in the second embodiment with a same beneficial effect, which will thus not be particularly defined herein.

In a possible embodiment of the present disclosure, the resource occupation symbol of the control channel reference signal may include at least one symbol in the control channel, at least one symbol beyond the control channel and/or at least one symbol in an uplink/downlink guard period.

The description about the resource occupation symbol of the control channel reference signal may refer to that mentioned in the second embodiment with a same beneficial effect, which will thus not be particularly defined herein.

In a possible embodiment of the present disclosure, the at least one symbol beyond the control channel may include at least one symbol adjacent to, and prior to, the control channel, and/or at least one symbol adjacent to, and after, the control channel.

The description about the at least one symbol beyond the control channel may refer to that mentioned in the second embodiment with a same beneficial effect, which will thus not be particularly defined herein.

In a possible embodiment of the present disclosure, the resource occupation symbol of the control channel reference signal may be used for detecting interference between the network side devices, or a symbol for detecting interference between the UEs, or a symbol for detecting a an uplink service heavy sub-frame, or a symbol for detecting a downlink service heavy sub-frame.

The description about the multiplexing of the resource occupation symbol of the control channel reference signal may refer to that mentioned in the second embodiment with a same beneficial effect, which will thus not be particularly defined herein.

In a possible embodiment of the present disclosure, a same resource of the control channel reference signal may be occupied by different UEs, and the control channel reference signals for different UEs may be differentiated from each other in a time-division, frequency-division, code-division and/or cyclic shift manner.

The description about the differentiation modes may refer to that mentioned in the second embodiment with a same beneficial effect, which will thus not be particularly defined herein.

In a possible embodiment of the present disclosure, the receiving the reference signal configuration parameter form the network side device may include receiving the reference signal configuration parameter transmitted by the network side device through at least one of a broadcasting channel, RRC signaling, an MAC layer CE and a physical layer control message.

The reception of the reference signal configuration parameter may refer to the transmission of the reference signal configuration parameter mentioned in the second embodiment with a same beneficial effect, which will thus not be particularly defined herein.

In a possible embodiment of the present disclosure, the control channel reference signal may include an uplink control channel reference signal or a downlink control channel reference signal. The transmitting the reference signal in accordance with the reference signal configuration parameter may include transmitting the uplink control channel reference signal to the network side device in accordance with the reference signal configuration parameter, or receiving the downlink control channel reference signal from the network side device in accordance with the reference signal configuration parameter. The uplink control channel reference signal may be used for the demodulation of an uplink control channel, and the downlink control channel reference signal may be used for the demodulation of a downlink control channel.

The description about the control channel reference signal may refer to that mentioned in the second embodiment with a same beneficial effect, which will thus not be particularly defined herein.

According to the reference signal configuration method in the embodiments of the present disclosure, the UE may receive the reference signal configuration parameter from the network side device, and then transmit the reference signal in accordance with the reference signal configuration parameter. Because the reference signal configuration parameter is configured by the network side device, it is able for the reference signal to support various service types, various numerical configurations and various multiple access modes.

Fourth Embodiment

The present disclosure further provides in this embodiment a network side device capable of implementing the reference signal configuration method mentioned in the first and second embodiments with a same beneficial effect. As shown in FIG. 8, the network side device 800 includes a configuration module 801 and a transmission module 802 connected to the configuration module 801. The configuration module 801 is configured to configure a reference signal configuration parameter for a UE. The transmission module 802 is configured to transmit the reference signal configuration parameter configured by the configuration module to the UE. The reference signal configuration parameter may be used by the UE to transmit a reference signal.

In a possible embodiment of the present disclosure, the reference signal configuration parameter may be a control channel reference signal configuration parameter, and the control channel reference signal configuration parameter may include at least one of a frequency-domain density of a control channel reference signal, a minimum frequency domain resource allocation unit of a control channel, a minimum frequency domain resource allocation unit of the control channel reference signal, and an identifier of a resource occupation symbol of the control channel reference signal.

In a possible embodiment of the present disclosure, the resource occupation symbol of the control channel reference signal may include at least one symbol in the control channel, at least one symbol beyond the control channel and/or at least one symbol in an uplink/downlink guard period.

In a possible embodiment of the present disclosure, the at least one symbol beyond the control channel may include at least one symbol adjacent to, and prior to, the control channel, and/or at least one symbol adjacent to, and after, the control channel.

In a possible embodiment of the present disclosure, the resource occupation symbol of the control channel reference signal may be used for detecting interference between the network side devices, or a symbol for detecting interference between the UEs, or a symbol for detecting an uplink service heavy sub-frame, or a symbol for detecting a downlink service heavy sub-frame.

In a possible embodiment of the present disclosure, a same resource of the control channel reference signal may be occupied by different UEs, and the control channel reference signals for different UEs may be differentiated from each other in a time-division, frequency-division, code-division and/or cyclic shift manner.

In a possible embodiment of the present disclosure, the transmission module 802 is further configured to transmit the reference signal configuration parameter to the UE through a broadcasting channel, RRC signaling, an MAC layer CE and a physical layer control message.

In a possible embodiment of the present disclosure, the control channel reference signal may include an uplink control channel reference signal or a downlink control channel reference signal. The uplink control channel reference signal may be used for the demodulation of an uplink control channel, and the downlink control channel reference signal may be used for the demodulation of a downlink control channel.

According to the network side device in the embodiments of the present disclosure, the network side device may configure the reference signal configuration parameter for the UE, and transmit the reference signal configuration parameter to the UE. The reference signal configuration parameter may be used by the UE to transmit the reference signal. Because the reference signal configuration parameter is configured by the network side device, it is able for the reference signal to support various service types, various numerical configurations and various multiple access modes.

Fifth Embodiment

The present disclosure further provides in this embodiment a UE capable of implementing the reference signal configuration method in the third embodiment with a same beneficial effect. As shown in FIG. 9, the UE 900 includes a reception module 901 and a transmission module 902 connected to the reception module 901. The reception module 901 is configured to receive a reference signal configuration parameter from a network side device. The transmission module 902 is configured to transmit a reference signal in accordance with the reference signal configuration parameter received by the reception module.

In a possible embodiment of the present disclosure, the reference signal configuration parameter may be a control channel reference signal configuration parameter, and the control channel reference signal configuration parameter may include at least one of a frequency-domain density of a control channel reference signal, a minimum frequency domain resource allocation unit of a control channel, a minimum frequency domain resource allocation unit of the control channel reference signal, and an identifier of a resource occupation symbol of the control channel reference signal.

In a possible embodiment of the present disclosure, the resource occupation symbol of the control channel reference signal may include at least one symbol in the control channel, at least one symbol beyond the control channel and/or at least one symbol in an uplink/downlink guard period.

In a possible embodiment of the present disclosure, the at least one symbol beyond the control channel may include at least one symbol adjacent to, and prior to, the control channel, and/or at least one symbol adjacent to, and after, the control channel.

In a possible embodiment of the present disclosure, the resource occupation symbol of the control channel reference signal may be used for detecting interference between the network side devices, or a symbol for detecting interference between the UEs, or a symbol for detecting an uplink service heavy sub-frame, or a symbol for detecting a downlink service heavy sub-frame.

In a possible embodiment of the present disclosure, a same resource of the control channel reference signal may be occupied by different UEs, and the control channel reference signals for different UEs may be differentiated from each other in a time-division, frequency-division, code-division and/or cyclic shift manner.

In a possible embodiment of the present disclosure, the reception module is further configured to receive the reference signal configuration parameter transmitted by the network side device through a broadcasting channel, RRC signaling, an MAC layer CE and a physical layer control message.

In a possible embodiment of the present disclosure, the control channel reference signal may include an uplink control channel reference signal or a downlink control channel reference signal. The transmission module 902 is further configured to transmit the uplink control channel reference signal to the network side device in accordance with the reference signal configuration parameter, or receive the downlink control channel reference signal from the network side device in accordance with the reference signal configuration parameter. The uplink control channel reference signal may be used for the demodulation of an uplink control channel, and the downlink control channel reference signal may be used for the demodulation of a downlink control channel.

According to the UE in the embodiments of the present disclosure, the UE may receive the reference signal configuration parameter from the network side device, and transmit the reference signal in accordance with the reference signal configuration parameter. The reference signal configuration parameter may be used by the UE to transmit the reference signal. Because the reference signal configuration parameter is configured by the network side device, it is able for the reference signal to support various service types, various numerical configurations and various multiple access modes.

Sixth Embodiment

The present disclosure further provides in this embodiment a network side device capable of implementing the reference signal configuration method mentioned in the first and second embodiments with a same beneficial effect. As shown in FIG. 10, the network side device 1000 includes a processor 1001, a transceiver 1002, a memory 1003, a user interface 1004 and a bus interface. The processor 1001 is configured to read a program stored in the memory 1003, so as to: configure a reference signal configuration parameter for a UE; and transmit through the transceiver 1002 the reference signal configuration parameter to the UE. The reference signal configuration parameter may be used by the UE to transmit a reference signal. The transceiver 1002 is configured to receive and send data under the control of the processor 1001.

In FIG. 10, bus architecture may include any number of buses and bridges connected to each other, so as to connect various circuits for one or more processors 1001 and one or more memories 1003. In addition, as is known in the art, the bus architecture may be used to connect any other circuits, such as a circuit for a peripheral device, a circuit for a voltage stabilizer and a power management circuit. The bus interface may be provided, and the transceiver 1002 may consist of a plurality of elements, i.e., a transmitter and a receiver for communication with any other devices over a transmission medium. With respect to different UEs, the user interface 1004 may also be provided for devices which are to be arranged inside or outside the UE, and these devices may include but not limited to a keypad, a display, a speaker, a microphone and a joystick.

The processor 1001 may manage the bus architecture as well as general processing. The memory 1003 may store therein data for the operation of the processor 1001.

In a possible embodiment of the present disclosure, the reference signal configuration parameter may be a control channel reference signal configuration parameter, and the control channel reference signal configuration parameter may include at least one of a frequency-domain density of a control channel reference signal, a minimum frequency domain resource allocation unit of a control channel, a minimum frequency domain resource allocation unit of the control channel reference signal, and an identifier of a resource occupation symbol of the control channel reference signal.

In a possible embodiment of the present disclosure, the resource occupation symbol of the control channel reference signal may include at least one symbol in the control channel, at least one symbol beyond the control channel and/or at least one symbol in an uplink/downlink guard period.

In a possible embodiment of the present disclosure, the at least one symbol beyond the control channel may include at least one symbol adjacent to, and prior to, the control channel, and/or at least one symbol adjacent to, and after, the control channel.

In a possible embodiment of the present disclosure, the resource occupation symbol of the control channel reference signal may be used for detecting interference between the network side devices, or a symbol for detecting interference between the UEs, or a symbol for detecting an uplink service heavy sub-frame, or a symbol for detecting a downlink service heavy sub-frame.

In a possible embodiment of the present disclosure, a same resource of the control channel reference signal may be occupied by different UEs, and the control channel reference signals for different UEs may be differentiated from each other in a time-division, frequency-division, code-division and/or cyclic shift manner.

In a possible embodiment of the present disclosure, the processor 1001 is further configured to transmit the reference signal configuration parameter to the UE through a broadcasting channel, RRC signaling, an MAC layer CE and a physical layer control message.

In a possible embodiment of the present disclosure, the control channel reference signal may include an uplink control channel reference signal or a downlink control channel reference signal. The uplink control channel reference signal may be used for the demodulation of an uplink control channel, and the downlink control channel reference signal may be used for the demodulation of a downlink control channel.

According to the network side device in the embodiments of the present disclosure, the network side device may configure the reference signal configuration parameter for the UE, and transmit the reference signal configuration parameter to the UE. The reference signal configuration parameter may be used by the UE to transmit the reference signal. Because the reference signal configuration parameter is configured by the network side device, it is able for the reference signal to support various service types, various numerical configurations and various multiple access modes.

Seventh Embodiment

The present disclosure further provides in this embodiment a UE capable of implementing the reference signal configuration method in the third embodiment with a same beneficial effect. As shown in FIG. 11, the UE 1100 includes at least one processor 1101, a memory 1102, at least one network interface 1104 and a user interface 1103. The components of the UE 1100 may be coupled together through a bus system 1105. It should be appreciated that, the bus system 1105 is configured to achieve connection and communication among the components. Apart from a data bus, the bus system 1105 may further include a power source bus, a control bus and a state signal bus. For clarification, all these buses in FIG. 11 may be collectedly called as bus system 1105.

The user interface 1103 may include a display, a keyboard or a pointing device (e.g., mouse, track ball, touch plate or touch panel).

It should be appreciated that, the memory 1102 may be a volatile memory, a nonvolatile memory or both. The non-volatile memory may be a Read-Only Memory (ROM), a Programmable ROM (PROM), an Erasable PROM (EPROM), an electrically EPROM (EEPROM) or a flash memory. The volatile memory may be a Random Access Memory (RAM) which serves as an external high-speed cache. Illustratively but nonrestrictively, the RAM may include Static RAM (SRAM), Dynamic RAM (DRAM), Synchronous DRAM (SDRAM), Double Data Rate SDRAM (DDRSDRAM), Enhanced SDRAM (ESDRAM), Synchronous Link DRAM (SLDRAM) or Direct Rambus RAM (DRRAM). The memory 1102 intends to include, but not limited to, the above-mentioned and any other appropriate memories.

In a possible embodiment of the present disclosure, the following elements may be stored in the memory 1102: an executable module or data structure, a subset or an extended set thereof, an operating system 11021 and an application 11022.

The operating system 11021 may include various system programs, e.g., a framework layer, a core layer and a driving layer, so as to implement various basic services and process hardware-based tasks. The application 11022 may include various applications, e.g., Media Player and Browser, so as to implement various application services. The programs for implementing the above-mentioned method may be included in the application 11022.

In this embodiment, through calling a program or instruction stored in the memory 1102, e.g., a program or instruction stored in the application 11022, the processor 1101 is configured to: receive a reference signal configuration parameter from a network side device; and transmit a reference signal in accordance with the reference signal configuration parameter.

The above-mentioned method may be applied to, or implemented by, the processor 1101. The processor 1101 may be an integrated circuit (IC) having a signal processing capability. During the implementation, the steps of the above-mentioned method may be completed through an integrated logic circuit of hardware in the processor 1101 or instructions in the form of software. The processor 1101 may be a general-purpose processor, a digital signal processor, an application-specific integrated circuit (ASIC), a field programmable gate array (FPGA) or any other programmable logic element, a discrete gate or transistor logic element, or a discrete hardware assembly, which may be used to implement or execute the methods, steps or logic diagrams in the embodiments of the present disclosure. The general purpose processor may be a microprocessor or any other conventional processor. The steps of the method in the embodiments of the present disclosure may be directly implemented by the processor in the form of hardware, or a combination of hardware and software modules in the processor. The software module may be located in a known storage medium such as an RAM, a flash memory, an ROM, a PROM, an EEPROM, or a register. The storage medium may be located in the memory 1102, and the processor 1101 may read information stored in the memory 1102 so as to implement the steps of the method in conjunction with the hardware.

It should be appreciated that, the embodiments of the present disclosure may be implemented by hardware, software, firmware, middleware, microcode or a combination thereof. For the hardware implementation, the processor may include one or more of an ASIC, a DSP, a DSP device (DSPD), a Programmable Logic Device (PLD), an FPGA, a general-purpose processor, a controller, a microcontroller, a microprocessor, any other electronic unit capable of achieving the functions in the present disclosure, or a combination thereof.

For the software implementation, the scheme in the embodiments of the present disclosure may be implemented through modules capable of achieving the functions in the present disclosure (e.g., processes or functions). Software codes may be stored in the memory and executed by the processor. The memory may be implemented inside or outside the processor.

In a possible embodiment of the present disclosure, the reference signal configuration parameter may be a control channel reference signal configuration parameter, and the control channel reference signal configuration parameter may include at least one of a frequency-domain density of a control channel reference signal, a minimum frequency domain resource allocation unit of a control channel, a minimum frequency domain resource allocation unit of the control channel reference signal, and an identifier of a resource occupation symbol of the control channel reference signal.

In a possible embodiment of the present disclosure, the resource occupation symbol of the control channel reference signal may include at least one symbol in the control channel, at least one symbol beyond the control channel and/or at least one symbol in an uplink/downlink guard period.

In a possible embodiment of the present disclosure, the at least one symbol beyond the control channel may include at least one symbol adjacent to, and prior to, the control channel, and/or at least one symbol adjacent to, and after, the control channel.

In a possible embodiment of the present disclosure, the resource occupation symbol of the control channel reference signal may be used for detecting interference between the network side devices, or a symbol for detecting interference between the UEs, or a symbol for detecting an uplink service heavy sub-frame, or a symbol for detecting a downlink service heavy sub-frame.

In a possible embodiment of the present disclosure, a same resource of the control channel reference signal may be occupied by different UEs, and the control channel reference signals for different UEs may be differentiated from each other in a time-division, frequency-division, code-division and/or cyclic shift manner.

In a possible embodiment of the present disclosure, the processor 1101 is further configured to receive the reference signal configuration parameter transmitted by the network side device through a broadcasting channel, RRC signaling, an MAC layer CE and a physical layer control message.

In a possible embodiment of the present disclosure, the control channel reference signal may include an uplink control channel reference signal or a downlink control channel reference signal. The processor 1101 is further configured to transmit the uplink control channel reference signal to the network side device in accordance with the reference signal configuration parameter, or receive the downlink control channel reference signal from the network side device in accordance with the reference signal configuration parameter. The uplink control channel reference signal may be used for the demodulation of an uplink control channel, and the downlink control channel reference signal may be used for the demodulation of a downlink control channel.

According to the UE in the embodiments of the present disclosure, the UE may receive the reference signal configuration parameter from the network side device, and transmit the reference signal in accordance with the reference signal configuration parameter. The reference signal configuration parameter may be used by the UE to transmit the reference signal. Because the reference signal configuration parameter is configured by the network side device, it is able for the reference signal to support various service types, various numerical configurations and various multiple access modes.

Eighth Embodiment

The present disclosure further provides in this embodiment a UE capable of implementing the reference signal configuration method mentioned in the third embodiment with a same beneficial effect. As shown in FIG. 12, the UE 1200 includes a radio frequency (RF) circuit 1210, a memory 1220, an input unit 1230, a display unit 1240, a processor 1250, an audio-frequency circuit 1260, a communication module 1270 and a power source 1280.

The input unit 1230 is configured to receive digital or character information inputted by a user, and generate a signal input related to user settings and function control of the UE 1200. To be specific, the input unit 1230 may include a touch panel 1231, also called as touch screen, which is configured to collect a touch operation made by the user on or in proximity to the touch panel (e.g., an operation made by the user through any appropriate object or attachment (e.g., finger or stylus) on or in the proximity to the touch panel 1231) and driving a corresponding connection device according to the preset program. In a possible embodiment of the present disclosure, the touch panel 1231 may include a touch detection unit and a touch controller. The touch detection unit is configured to detect a touch orientation and a signal generated due to the touch operation, and transmit the signal to the touch controller. The touch controller is configured to receive touch information from the touch detection unit, convert it into coordinates of a touch point, transmit the coordinates to the processor 1250, and receive and execute a command from the processor 1250. In addition, the touch panel 1231 may be of a resistive type, a capacitive type, an infrared type or a surface acoustic wave (SAW) type. The input unit 1230 may further include an input device 1232 which includes, but not limited to, a physical keyboard, a functional button (e.g., a volume control button or an on/off button), a trackball, a mouse, and a joystick.

The display unit 1240 is configured to display information inputted by the user or information to be presented to the user, and various menu interfaces for the UE, and it may include a display panel 1241. In a possible embodiment of the present disclosure, the display panel 1241 may be a Liquid Crystal Display (LCD) panel or an Organic Light-Emitting Diode (OLED) panel.

It should be appreciated that, the touch panel 1231 may cover the display panel 1241, so as to form a touch display panel. When the touch operation made on or in proximity to the touch display panel has been detected, the touch information may be transmitted to the processor 1250 so as to determine a type of a touch event. Then, the processor 1250 may provide corresponding visual output on the touch display panel in accordance with the type of the touch event.

The touch display panel may include an application interface display region and a commonly-used controls display region. An arrangement mode of the two display regions will not be particularly defined herein, e.g., one of the two display regions may be arranged above or under the other, or arranged to the left or the right of the other. The application interface display region may be used to display interfaces for applications, and each interface may include an icon for at least one application and/or an interface element such as Widget desktop control. The application interface display region may also be a blank interface where no content is contained. The commonly-used controls display region may be used to display controls which are used frequently, e.g., setting button, interface number, scroll bar, or such application icons as telephone book icon.

The processor 1250 may be a control center of the UE 1200, and connected to each member of the entire UE via various interfaces and lines. The processor 1460 is configured to run or execute software programs and/or modules stored in a first memory 1221, and call data stored in a second memory 1222, so as to achieve various functions of the UE 1200 and process the data, thereby to monitor the UE 1200. In a possible embodiment of the present disclosure, the processor 1250 may include one or more processing units.

In this embodiment, through calling the software program and/or module stored in the first memory 1221 and/or the data stored in the second memory 1222, the processor 1250 is configured receive a reference signal configuration parameter from a network side device, and transmit a reference signal in accordance with the reference signal configuration parameter.

In a possible embodiment of the present disclosure, the reference signal configuration parameter may be a control channel reference signal configuration parameter, and the control channel reference signal configuration parameter may include at least one of a frequency-domain density of a control channel reference signal, a minimum frequency domain resource allocation unit of a control channel, a minimum frequency domain resource allocation unit of the control channel reference signal, and an identifier of a resource occupation symbol of the control channel reference signal.

In a possible embodiment of the present disclosure, the identifier of the resource occupation symbol of the control channel reference signal may include at least one symbol in the control channel, at least one symbol beyond the control channel and/or at least one symbol in an uplink/downlink guard period.

In a possible embodiment of the present disclosure, the at least one symbol beyond the control channel may include at least one symbol adjacent to, and prior to, the control channel, and/or at least one symbol adjacent to, and after, the control channel.

In a possible embodiment of the present disclosure, the resource occupation symbol of the control channel reference signal may be used for detecting interference between the network side devices, or a symbol for detecting interference between the UEs, or a symbol for detecting an uplink service heavy sub-frame, or a symbol for detecting a downlink service heavy sub-frame.

In a possible embodiment of the present disclosure, a same resource of the control channel reference signal may be occupied by different UEs, and the control channel reference signals for different UEs may be differentiated from each other in a time-division, frequency-division, code-division and/or cyclic shift manner.

In a possible embodiment of the present disclosure, the processor 1250 is further configured to the reference signal configuration parameter transmitted by the network side device through a broadcasting channel, RRC signaling, an MAC layer CE and a physical layer control message.

In a possible embodiment of the present disclosure, the control channel reference signal may include an uplink control channel reference signal or a downlink control channel reference signal. The processor 1250 is further configured to transmit the uplink control channel reference signal to the network side device in accordance with the reference signal configuration parameter, or receive the downlink control channel reference signal from the network side device in accordance with the reference signal configuration parameter. The uplink control channel reference signal may be used for the demodulation of an uplink control channel, and the downlink control channel reference signal may be used for the demodulation of a downlink control channel.

According to the UE in the embodiments of the present disclosure, the UE may receive the reference signal configuration parameter from the network side device, and transmit the reference signal in accordance with the reference signal configuration parameter. The reference signal configuration parameter may be used by the UE to transmit the reference signal. Because the reference signal configuration parameter is configured by the network side device, it is able for the reference signal to support various service types, various numerical configurations and various multiple access modes.

It should be appreciated that, units and steps described in the embodiments of the present disclosure may be implemented in the form of electronic hardware, or a combination of a computer program and the electronic hardware. Whether or not these functions are executed by hardware or software depends on specific applications or design constraints of the technical solution. Different methods may be used with respect to the specific applications so as to achieve the described functions, without departing from the scope of the present disclosure.

It should be further appreciated that, for convenience and clarification, operation procedures of the system, device and units described hereinabove may refer to the corresponding procedures in the method embodiment, and thus will not be particularly defined herein.

It should be further appreciated that, the device and method may be implemented in any other ways. For example, the embodiments for the apparatus is merely for illustrative purposes, and the modules or units are provided merely on the basis of their logic functions. During the actual application, some modules or units may be combined together or integrated into another system. Alternatively, some functions of the module or units may be omitted or not executed. In addition, the coupling connection, direct coupling connection or communication connection between the modules or units may be implemented via interfaces, and the indirect coupling connection or communication connection between the modules or units may be implemented in an electrical or mechanical form or in any other form.

The units may be, or may not be, physically separated from each other. The units for displaying may be, or may not be, physical units, i.e., they may be arranged at an identical position, or distributed on a plurality of network elements. Parts or all of the units may be selected in accordance with the practical need, so as to achieve the purpose of the present disclosure.

In addition, the functional units in the embodiments of the present disclosure may be integrated into a processing unit, or the functional units may exist independently, or two or more functional units may be combined together.

In the case that the functional units are implemented in a software form and sold or used as a separate product, they may be stored in a computer-readable medium. Based on this, the technical solutions of the present disclosure, partial or full, or parts of the technical solutions of the present disclosure contributing to the related art, may appear in the form of software products, which may be stored in a storage medium and include several instructions so as to enable computer equipment (a personal computer, a server or network equipment) to execute all or parts of the steps of the method according to the embodiments of the present disclosure. The storage medium includes any medium capable of storing therein program codes, e.g., a universal serial bus (USB) flash disk, a mobile hard disk (HD), a read-only memory (ROM), a random access memory (RAM), a magnetic disk or an optical disk.

The above embodiments are for illustrative purposes only, but the present disclosure is not limited thereto. Obviously, a person skilled in the art may make further modifications and improvements without departing from the spirit of the present disclosure, and these modifications and improvements shall also fall within the scope of the present disclosure.

What is claimed is:

1. A reference signal configuration method used in a network side device, comprising:
   configuring, by the network side device, a reference signal configuration parameter for a User Equipment (UE); and
   transmitting, by the network side device, the reference signal configuration parameter to the UE,
   receiving, by the network side device, an uplink control channel reference signal transmitted in accordance with the reference signal configuration parameter from the UE, and
   performing, by the network side device, demodulation of an uplink control channel using the uplink control channel reference signal,
   wherein the reference signal configuration parameter is a control channel reference signal configuration parameter, the control channel reference signal configuration parameter comprises at least one of a minimum frequency domain resource allocation unit of a control channel, and a minimum frequency domain resource allocation unit of a control channel reference signal, and the reference signal configuration parameter is used by the UE to transmit the uplink control channel reference signal,
   wherein the control channel reference signal comprises the uplink control channel reference signal, and the uplink control channel reference signal is used for the demodulation of the uplink control channel,
   wherein the resource occupation symbol of the control channel reference signal comprises at least one symbol beyond the control channel,
   wherein the at least one symbol beyond the control channel comprises at least one symbol adjacent to, and prior to, the control channel, and/or at least one symbol adjacent to, and after, the control channel, wherein the resource occupation symbol of the control channel reference signal is a symbol used for detecting interference between the network side devices, or a symbol for detecting interference between the UEs, or a symbol for detecting an uplink service heavy sub-frame, or a symbol for detecting a downlink service heavy sub-frame.

2. The reference signal configuration method according to claim 1, wherein a same resource of the control channel reference signal is occupied by different UEs, and the control channel reference signals for different UEs are differentiated from each other in a code-division and/or cyclic shift manner.

3. The reference signal configuration method according to claim 1, wherein the transmitting the reference signal configuration parameter to the UE comprises transmitting the reference signal configuration parameter to the UE through at least one of a broadcasting channel, Radio Resource Control (RRC) signaling, a Media Access Control (MAC) layer Control Element (CE) and a physical layer control message.

4. A reference signal configuration method used in a user equipment (UE), comprising:
receiving a reference signal configuration parameter from a network side device, the reference signal configuration parameter being a control channel reference signal configuration parameter, the control channel reference signal configuration parameter comprising at least one of a minimum frequency domain resource allocation unit of a control channel, and a minimum frequency domain resource allocation unit of a control channel reference signal; and
transmitting an uplink control channel reference signal to the network side device in accordance with the reference signal configuration parameter,
wherein the control channel reference signal comprises the uplink control channel reference signal, and the uplink control channel reference signal is used for the demodulation of an uplink control channel performed by the network side device,
wherein the resource occupation symbol of the control channel reference signal comprises at least one symbol beyond the control channel,
wherein the at least one symbol beyond the control channel comprises at least one symbol adjacent to, and prior to, the control channel, and/or at least one symbol adjacent to, and after, the control channel,
wherein the resource occupation symbol of the control channel reference signal is a symbol used for detecting interference between the network side devices, or a symbol for detecting interference between the UEs, or a symbol for detecting an uplink service heavy sub-frame, or a symbol for detecting a downlink service heavy sub-frame.

5. The reference signal configuration method according to claim 4, wherein a same resource of the control channel reference signal is occupied by different UEs, and the control channel reference signals for different UEs are differentiated from each other in a code-division and/or cyclic shift manner.

6. The reference signal configuration method according to claim 4, wherein the receiving the reference signal configuration parameter from the network side device comprises receiving the reference signal configuration parameter transmitted by the network side device through at least one of a broadcasting channel, RRC signaling, a Media Access Control (MAC) layer Control Element (CE) and a physical layer control message.

7. The reference signal configuration method according to claim 4,
wherein the transmitting the reference signal in accordance with the reference signal configuration parameter comprises transmitting the uplink control channel reference signal to the network side device in accordance with the reference signal configuration parameter, or receiving the downlink control channel reference signal from the network side device in accordance with the reference signal configuration parameter,
wherein the uplink control channel reference signal is used for the demodulation of an uplink control channel, and the downlink control channel reference signal is used for the demodulation of a downlink control channel.

8. A network side device, comprising a processor, a memory, and a computer program stored in the memory and executed by the processor, wherein the computer program is executed by the processor so as to implement the reference signal configuration method according to claim 1.

9. A user equipment (UE), comprising a processor, a memory, and a computer program stored in the memory and executed by the processor, wherein the computer program is executed by the processor so as to implement the reference signal configuration method according to claim 4.

* * * * *